(No Model.)
B. FITTS.
ROTARY WATER METER.
No. 258,197. Patented May 16, 1882.
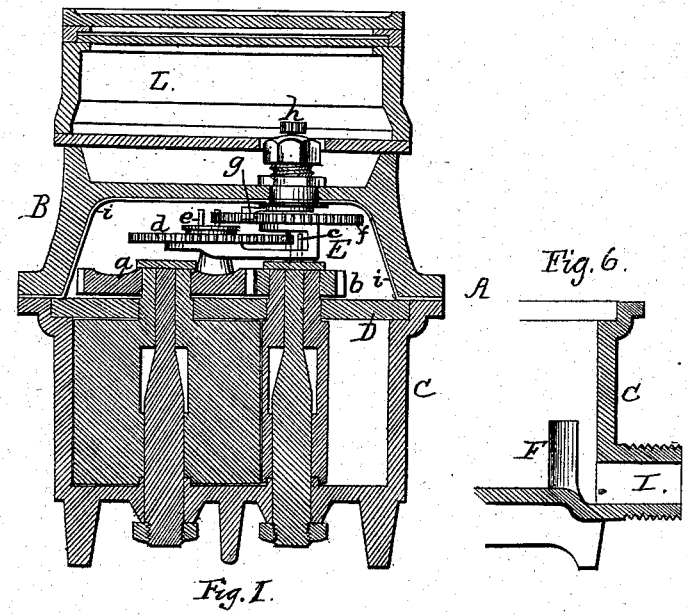
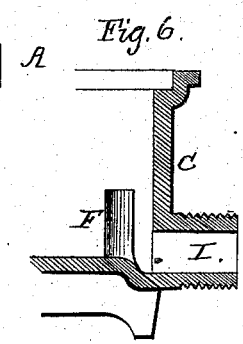
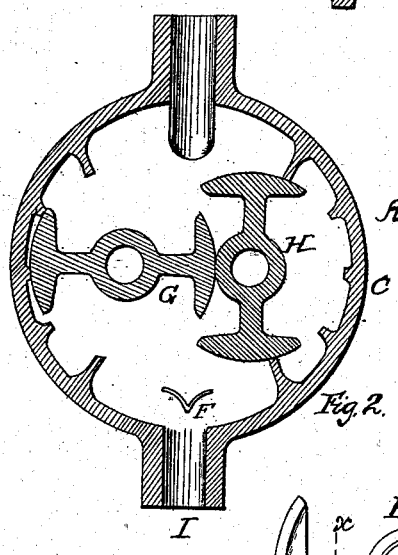
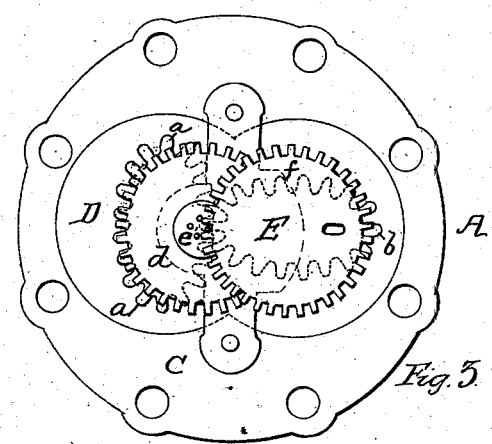
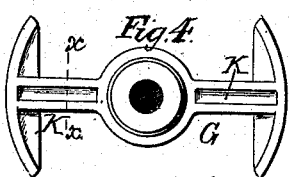
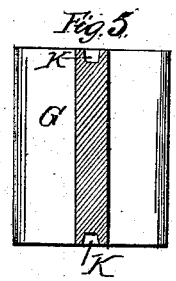
Attest:
D. O. Smith
W. C. Chaffee
Inventor:
Benaiah Fitts
by Hannay & Brock
Att'ys

UNITED STATES PATENT OFFICE.

BENAIAH FITTS, OF WORCESTER, MASSACHUSETTS, ASSIGNOR TO THE UNION WATER METER COMPANY, OF SAME PLACE.

ROTARY WATER-METER.

SPECIFICATION forming part of Letters Patent No. 258,197, dated May 16, 1882.

Application filed September 30, 1880. (No model.)

*To all whom it may concern:*

Be it known that I, BENAIAH FITTS, a citizen of the United States, residing at Worcester, in the county of Worcester and State of Massachusetts, have invented certain new and useful Improvements in Water-Meters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the novel construction and arrangement of the parts of a water-meter.

In the practical operation of meters it is well-known in the art that in all meters, gas as well as water, that the mechanisms used to record and measure the fluid as it passes through the meter derive their motion from the fluid itself, and it is therefore evident that when a very small stream of water is being drawn through the meter that but a small amount of power is developed; and it is further evident that when a meter is designed to take a very wide range—that is, to pass and register a heavy stream, and also to register correctly when the stream is reduced to a little more than drops—it will be necessary to utilize all the power or force there is in the small stream, and also so construct the meter that it will be operated by a small amount of power, while all the different parts are large enough to pass a large stream.

The object and design of my invention therefore is to so construct the several parts of a meter that it will be acted upon and correctly register a small stream, and at the same time not be accelerated under a large stream.

To attain these desired objects my invention consists, first, by providing the measuring or piston chamber of the meter at or near the induction-opening with a deflector projecting from one of the walls of the meter-shell into the interior of the piston-chamber, so as to lie across the inlet-opening and direct the moving column of water in the direction of the moving blade of the piston; secondly, by providing grooves or depressions in the ends of the pistons, whereby a water-packing is formed between the ends of the pistons and the adjacent walls of the meter-shell, thus not only preventing the water from passing between the ends of the pistons and walls of the shell, and causing it to act against the pistons, but also preventing sand or other sediment from wedging in between the walls of the shell and ends of the pistons, thereby causing friction.

Heretofore the intermediate mechanism receiving motion from the pistons and imparting it to the "registering mechanism" has been made of metal, and was therefore costly to make and fit up, heavy and difficult to move save under a strong pressure of water. Moreover, they soon corrode, thereby causing the pistons to exert considerable force in order to operate said mechanism, thus defeating the object sought to be obtained in the present state of the art—a sensitive and positive displacing-meter that shall respond to the slightest current of water that can be made to flow—a state of things hitherto unknown to the art.

Figure 1 of the drawings represents a central vertical section of a water-meter, showing my improvements applied thereto. Fig. 2 represents a horizontal section taken through the rotary pistons and lower half of the meter-shell, and shows their arrangement and that of the deflector, and the induction and eduction openings. Fig. 3 represents a plan view of the intermediate gearing and lower half of the meter-shell, the registering-case and upper case of meter being removed. Fig. 4 represents an end view of one of the pistons; and Fig. 5, a section of the same, taken through the line $x$ $x$ of Fig. 4. Fig. 6 represents a detail section of the meter-casing.

In the accompanying drawings, A represents the meter-shell proper, which is composed of two parts or halves, B and C, securely bolted together when in working position. Between the halves of the casing A is secured a plate or diaphragm, D, lodged in an annular seat in the casing C, and forms a partition between the measuring or piston chamber and the compartment containing the rubber intermediate gearing, E. This gearing E may be of any suitable construction and arrangement, so that the pistons G H shall maintain a certain relative speed with respect to each other, and which varies according to the nature and design of the pistons employed. In this instance the pistons G H are connected by the elliptical gears $a$ $b$, one of which, as $b$, carrying a pinion, $c$, which meshes with the gear-wheel $d$. This wheel $d$ carries a pinion, $e$, which engages the toothed wheel $f$, and which imparts motion to the crank-arm $g$ of the registering-shaft $h$, through which the registering devices proper are operated. By constructing this mechanism in a water-meter of hard rubber all tendency of said mechanism to rust or corrode, owing to the presence of foreign matter held in solution in the water, is obviated, and a light and easily-running system of gears is provided, exceeding in durability those made of metal, and by means of which a very sensitive-acting water-meter is rendered practicable.

F represents a deflector, and is placed by preference a short distance within the chamber for the pistons and from the mouth of the induction-opening I. This deflector is so arranged as to lie across the mouth of the induction-opening, but not extending throughout the depth of the meter, thereby providing a ready access to the opening from the inside, enabling the removal of obstructions at that point, should the opening become clogged, and at the same time to direct the moving column of water to the then acting blade or blades of the piston. These pistons G H are by preference constructed of hard rubber. To make the action of the meter more effective, depressions K are formed in the ends of the pistons, which serve to prevent sand or other sediment from wedging in between the ends of the pistons and the adjacent walls of the meter-shell, and which depressions or grooves K also serve as a water-packing between the same parts. These depressions K are illustrated in Figs. 4 and 5 of the drawings.

Hard rubber is almost of the same specific gravity as water, and hence by constructing the intermediate mechanism and pistons before mentioned of hard rubber it is also in its rotation buoyed or held in suspension in the water, in addition to its other peculiar advantages before enumerated, whereby it is enabled to operate with practically no friction.

The registering mechanism is not shown in its casing L, as it forms no part of this invention.

$i$ is a lining of non-corrosive material, and serves to protect the working parts of the meter.

Having described my invention, what I claim is—

1. A water-meter provided with a deflector arranged at the induction-opening within the meter-shell and projecting across the opening, but not extending throughout the depth of the piston-chamber, substantially as set forth.

2. In combination with two coacting pistons provided with radial blades having at their ends segmental bearing-surfaces, a deflector arranged at the induction-opening within the meter-shell and projecting across the opening, but not extending throughout the depth of the piston-chamber, substantially as set forth.

3. A rotary piston having its ends provided with grooves or depressions K, to form a water-packing and to prevent sand or other sediment from wedging in between the ends of the piston and the adjacent wall of the meter-shell, for the purpose set forth.

In testimony whereof I affix my signature in presence of two witnesses.

BENAIAH FITTS.

Witnesses:
JOHN C. OTIS,
JOHN P. K. OTIS.